UNITED STATES PATENT OFFICE.

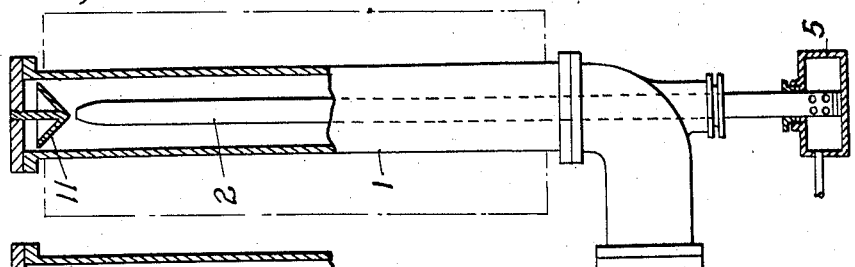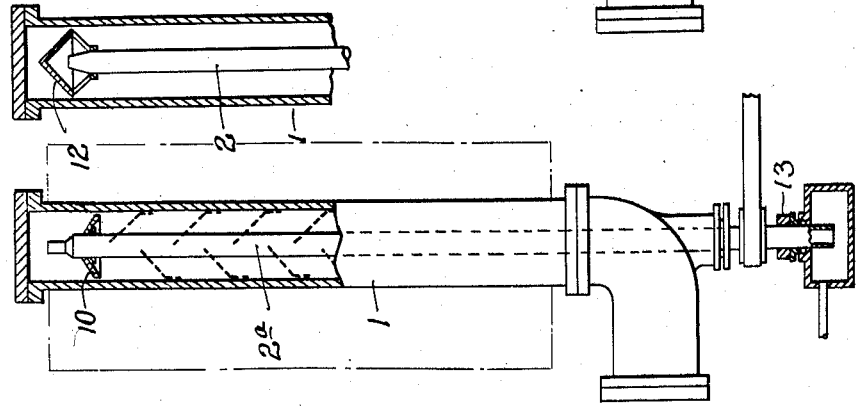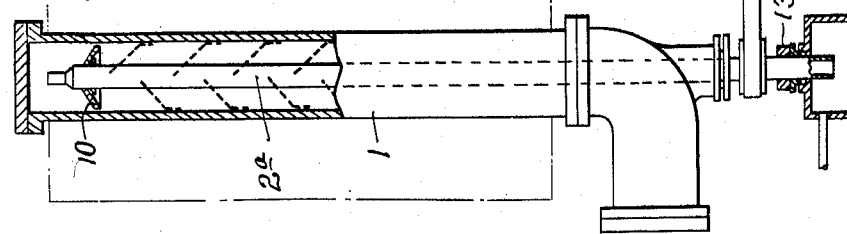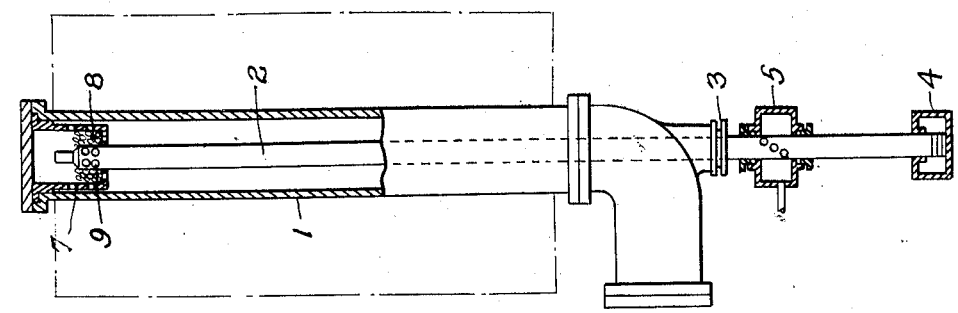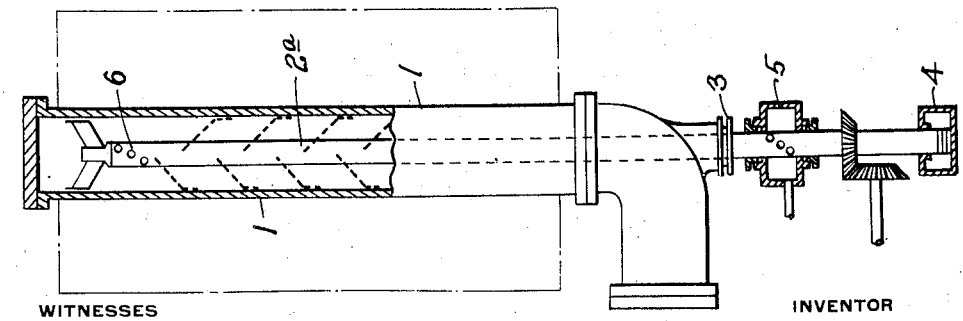

WALTER F. RITTMAN, OF PITTSBURGH, PENNSYLVANIA.

TREATMENT OF HYDROCARBONS.

1,365,602.   Specification of Letters Patent.   Patented Jan. 11, 1921.

Application filed February 5, 1917. Serial No. 146,723.

*To all whom it may concern:*

Be it known that I, WALTER F. RITTMAN, residing at Pittsburgh, in the county of Allegheny and State of Pennsylvania, a citizen of the United States, have invented or discovered certain new and useful Improvements in the Treatment of Hydrocarbons, of which improvements the following is a specification.

In the practice of what is known as the Rittman cracking process, (see Department of the Interior Bulletin No. 114,) wherein oil in the gaseous state is subjected to various combinations of time, temperature and pressure, in order to create desired types of low boiling hydrocarbons from high boiling hydrocarbons, the proper preparation of the raw oil for the chemical change known as cracking is of great importance. This proper preparation involves, first, the heating of the oil to such a high temperature preferably to or approximately to the boiling temperature of the liquid, so that upon introduction into the cracking retort, or chamber, it will be substantially and instantaneously vaporized, and second, the heating of the gases and vapors to a cracking temperature.

The present invention has for its object the efficient preparation of the oil for gasification and cracking within the cracking retort itself, under such controllable conditions that the temperature of the oil may be raised to or above the boiling point of the liquid, but preferably without substantial vaporization taking place prior to the discharge of contents into the heated retort or chamber proper. This is accomplished by passing the oil upward through suitable means, as for example, a hollow core or pipe extending upwardly into the retort and so constructed as to direct the oil into the retort in any desired manner. For example, the openings may be so spaced at the top, and made of such diameter as to cause the heated oil or vapors to be ejected against the highly heated inner wall of the cracking retort in such finely divided streams that vaporization will be completed almost instantaneously. The preferable instantaneous and complete vaporization of the liquid as it enters the retort, can be facilitated by subjecting the oil in the hollow core or pipe, to a pressure sufficiently high to permit the oil being heated without substantially changing its liquid condition. Such pressure on the liquid can be readily obtained by properly proportioning the rates of feed of oil into the pipe and its discharge into the cracking retort. The effect of this super-pressure is to raise the boiling point of the liquid so that the reduction in pressure following its injection into the heated retort, coupled with subjection to the high heat in such retort, and the impingement upon the highly heated walls of the retort, will cause the liquid to instantaneously expand into vapor. Vaporization will be facilitated by subdividing the liquid into fine sprays as it enters the retort and by causing such finely divided sprays to impinge upon highly heated surfaces. These conditions can be effected by arranging suitable openings in the top of the hollow core, and arranging a cone or bell, either upright or inverted, in such relation to such openings that the heated fluid will be broken up by the impingement against the surface of the bell or cone and be directed in such condition against the inner surface of the retort. Where a spreading device is used as an aid to instantaneous gasification of the liquid upon the entrance into the cracking retort, the cone or bell shaped device referred to is preferred, but other means may be employed for that purpose. As for example, the liquid may be discharged into a mass of small pieces of metal or other refractory material, contained in a basket preferably supported by the hollow core in suitable relation to the outlets from the core, or the outlet from the core may be so constructed and arranged that the fine streams of liquid will be directed against the inner surface of the retort.

The oil is introduced at the bottom of the inner core, and in its upward flow is subjected to the heat from the vapors and gases flowing in the opposite direction through the retort. As in the usual manner of practising the vapor phase cracking process, it is preferred to employ a substantially vertical tubular retort and to vaporize the liquid and to, at least, initiate the cracking in the upper portions of the retort, such portion will be most highly heated and hence the oil in flowing through the hollow core will be progressively heated and every heat unit possible will be forced into the liquid prior to its discharge into the retort. The embodiment of this counter current heat exchange in the practice of the Rittman process is desirable and highly advantageous as it permits the carrying out of the first step of said process, i. e., raising the oil to or above boiling temperature by heat previously employed in effecting other steps as described in application filed Feb. 5, 1917, Serial Number 146,724, and also initiates other steps of the process, i. e. condensation and segregation of the products of cracking. As the oil fed into the hollow core will be at a temperature far below the cracking temperature of the vapors, the latter will be progressively cooled as they flow from the cracking zone, so that while there may not be a great amount of condensation effected in the lower portion of the retort, there will be such an extraction of heat by the cold oil, that only a slightly further extraction of heat from the vapors will produce a condensation of the more easily condensed constituents of the cracked products.

In the operation of the vapor phase cracking process under conditions where carbon is formed in considerable quantities, and the use of mechanical means for the continuous removal of such carbon from the walls of the cracking chamber is desirable, an apparatus may be used consisting of a rod extending up into the retort and provided with means for wiping the inner surfaces of the retort, such as short pieces of chain. When, in the practice of the invention described and claimed herein, it is necessary or desirable to use carbon removing means, the rod forming part of such means may be made hollow and the oil fed therethrough as herein described, the inner core being used for the double function of raising the temperature of the oil to be cracked and the removal of the carbon from the walls of the retort.

It will be understood that vaporization may occur, to a greater or less degree, in the inner core or tube. This may be an advantage, as it may be preferred to so operate in order to effect substantial vaporization of the oil prior to discharging the contents of the tube into the cracking retort, thereby permitting maximum utilization of the cracking retort for cracking purposes.

In the accompanying drawing forming a part of this specification, Figure 1 is a view partly in elevation and partly in section showing a tubular retort such as is preferably employed in the practice of the Rittman process, provided with oil feeding means, extending up into the retort. Figs. 2, 3, and 4 are similar views illustrating modifications, and Fig. 5 is a sectional elevation of the upper portion of the retort and showing a modified form of a liquid spreader.

The retort 1 is of the usual or any suitable construction having an opening in its lower end through which extends the hollow core or pipe 2, for a distance dependent upon the desired location of what is known as the reaction zone, in the Rittman process. The opening through which the core extends is closed by a suitable packing adapted to withstand the heat and pressure in the retort. In the construction shown in Figs. 1 and 2, the lower end of the core is supported by step bearings 4 of any suitable construction. As the lower end of the core is closed, it is surrounded as a part intermediate the stuffing box 3 and bearings 4 by a drum 5, provided with stuffing boxes where the core passes through its upper and lower walls. The portion of the core within the drum is provided with openings, to permit of the flow of oil into the core, the oil being forced into the drum with sufficient pressure to insure the desired flow or escape through suitable openings, at or adjacent to the upper end of the core. In the construction shown in Fig. 1 holes or openings 6 are formed in the core in such manner that the oil will be forced out in fine streams and caused to impinge against the inner highly heated surfaces of the retort.

In the construction shown in Fig. 2, the upper end of the core projects into a basket 8 having perforated walls, and having arranged therein a mass of small pieces 7 of refractory material, such as iron balls, and the outlet openings 9, for the discharge of oil are so arranged that the oil will be discharged into a mass of balls 7 and spread in thin films over the surface thereof, thus insuring the rapid vaporization of the oil. In the construction shown in Figs. 3, 4, and 5, the oil is discharged from the core through its upper end, and suitable means are provided whereby the oil may be broken up into streams or sprays to facilitate its vaporization. In Fig. 3, a perforated cone 10 is arranged below the outlet from the core, so that the oil will flow down onto the cone and pass therethrough in fine streams. In Fig. 4, an inverted cone 11 is arranged with its apex in line, or approximately in line vertically, with the outlet from the core, so that the stream of oil issuing from the core will be broken up by the contact with the cone, and directed against the inner surfaces of the retort. In Fig. 5, the cone 12 is shown in a reversed position but its operation will be substantially the same as in Fig. 4, i. e. the oil will be broken up or spread in a thin film over the surface of the cone, and directed against the inner surface of the retort. It is characteristic of the construction shown in Figs. 2, 3, 4, and 5, that auxiliary vaporizing surfaces are provided in the form of either the metal balls or the cones.

As shown in Fig. 3, the lower end of the core is open so that the oil may enter therethrough, and the core is provided with a shoulder 13, resting on the top of the drum, from which the oil is forced into the core. As shown in Fig. 4, the bottom of the drum 5, may serve as a step bearing for the lower end of the cone.

In the construction shown in Figs. 1 and 3, the carbon removing devices consist of a rod or shaft 2ª longitudinally arranged in the retort and so mounted as to be capable of being so operated as to cause devices carried by the rod or shaft to scrape along the wall of the tube removing the adhering carbon. In the construction shown herein, the carbon detaching means consists of chains of such lengths that their outer ends will strike against the inner surfaces of the retort and remove the carbon deposited thereon. The improvement described herein may be carried out in the carbon removing apparatus by making the rod or shaft hollow and causing the oil to flow up through the tube.

As shown in Figs. 1 and 3, provision is made whereby suitable gearing or belting may be used to rotate the hollow core or shaft as described, when it is desired to employ it for feeding the oil and removing the carbon from the walls of the retort.

The retort is heated by a suitable furnace diagrammatically shown and marked 20.

I claim herein as my invention:

1. An apparatus for vapor phase cracking comprising a substantially upright stationary tubular retort closed at its upper end, means for maintaining the upper portion of the retort at a temperature substantially above the vaporizing temperature of the oil, a hollow tube extending upward within and into proximity of the upper end of said retort, said tube being provided with an outlet so located as to discharge the oil against surfaces adjacent to the upper end of the retort and heated above the vaporizing temperature of the oil, means for feeding oil into such tube and means for withdrawing the products of reaction effected in the retort from a space between the tube and the retort.

2. An apparatus for vapor phase cracking comprising a substantially upright stationary tubular retort closed at its upper end, means for maintaining the upper portion of the retort at a temperature substantially above the vaporizing temperature of the oil, a hollow tube extending upward within and into proximity to the upper end of said retort, said tube being provided with an outlet so located as to discharge the oil against the surfaces within and adjacent to the upper end of the retort and heated above the vaporizing temperature of the oil, means for feeding oil into such tube, means arranged in operative relation to the outlet for distributing oil in thin films over the surfaces of the retort and means for withdrawing products of reaction effected in the retort from the space between the tube and the retort.

3. In an apparatus for vapor phase cracking comprising a substantially upright stationary tubular retort, closed at its upper end, means for maintaining the upper portion of the retort at a temperature substantially above the vaporizing temperature of the oil, a hollow tube extending upward within and into proximity to the upper end of said retort, said tube being provided with an outlet so located as to discharge oil against the surfaces within the retort and adjacent to the upper end of the retort and heated above the vaporizing temperatures of the oil, means for feeding oil into such tube, means carried by the rod adapted to scrape along its inner surfaces of the retort, to effect the removal of carbon adhering to the walls of the retort and means for withdrawing products of reaction effected in the retort from a space between the tube and the retort.

In testimony whereof I have hereunto set my hand.

WALTER F. RITTMAN.